United States Patent [19]

Hofstraat et al.

[11] Patent Number: 5,776,375
[45] Date of Patent: Jul. 7, 1998

[54] ELECTRO-OPTICAL DEVICE STABLE IN THE 600–1600 NANOMETER WAVELENGTH RANGE

[75] Inventors: Johannes Willem Hofstraat, Doetinchem; Marinus Cornelis Flipse, Zutphen; Richard Herman Woudenberg, Rotterdam, all of Netherlands

[73] Assignee: Akzo Nobel N.V., Arnhem, Netherlands

[21] Appl. No.: 600,665

[22] Filed: Feb. 13, 1996

[30] Foreign Application Priority Data

Dec. 22, 1995 [EP] European Pat. Off. ............ 95203566

[51] Int. Cl.$^6$ .................................. F21V 9/00; G02B 6/00
[52] U.S. Cl. .................... 252/582; 385/122; 359/326; 359/328
[58] Field of Search ........................ 252/582; 385/122; 359/326, 328

[56] References Cited

U.S. PATENT DOCUMENTS

| 4,936,645 | 6/1990 | Yoon et al. ............................. 385/122 |
| 5,208,299 | 5/1993 | Bales et al. ............................ 525/437 |
| 5,401,612 | 3/1995 | Etzbach et al. ........................ 252/582 |
| 5,588,083 | 12/1996 | Boonstra et al. ...................... 252/582 |
| 5,616,678 | 4/1997 | Beckmann et al. .................... 252/582 |

FOREIGN PATENT DOCUMENTS

| 0 350 112 | 1/1990 | European Pat. Off. ........ C08G 18/67 |
| WO 94/01480 | 1/1994 | WIPO ............................ C08G 18/67 |
| WO 94/08269 | 4/1994 | WIPO ............................ G02F 1/35 |

OTHER PUBLICATIONS

Allen et al, "Ethyl Benzalmalonate" 25 *Organic Syntheses* 42–45 (1945).

Bedworth et al., "Attempts to Optimize Thermal Stability and Second–Order Optical Nonlinearities of Dyes for Electrooptic Materials", presented at ICONO Conference in Japan (Jul. 1995).

P.F. Gordon et al., *Organic Chemistry in Colour* 289 (1983).

Kajigaeshi et al, "Halogenation Using Quaternary Ammonium Polyhalides. VIII. Iodination of Aromatic Amines by Use of Benzyltrimethylammonium Dichloroiodate (1–)", 61 *Bull. Chem. Soc'y of Japan* 600–602 (Feb. 1988).

B.C. McKusick. et al., "Cyanocarbon Chemistry VI. Tricyanovinylamines", 80 *J. Amer. Chem. Soc'y* 2806–2815 (Jun. 5, 1958).

Moylan et al., "Nonlinear Optical Chromophores with Large Hyperpolarizabilities and Enhanced Thermal Stabilities", 115 *J. Amer. Chem. Soc'y* 12599–12600 (Dec. 29, 1993).

K.C. Rice, "A Rapid, High–Yield Conversion of Codeine to Morphine" 20 *J. of Medicinal Chem.* 164–165 (1977).

Soai, et al., "Sodium Borohydride–t–Butyl Alcohol–Methanol As An Efficient System For the Selective Reduction of Esters", 12 *Synthetic Communications* 463–467 (1982).

Twieg et al., "Nonlinear Optical Chromophores and Polymers for Practical Electro–Optic Waveguide Application", SPIE Proceedings vol. 2413, pp. 2–13 (Conference Jan. 25–26, 1994; conference indexed Jun. 3, 1994).

*Primary Examiner*—Philip Tucker
*Attorney, Agent, or Firm*—Loretta A. Miraglia; Louis A. Morris

[57] ABSTRACT

The present invention provides an electro-optical device comprising NLO polymer in the active layer with improved stability for light in the wavelength range of 600–1600 nm is guided through the device. The present invention is directed to an electro-optical device comprising two cladding layers and an active layer sandwiched between these cladding layers, with the active layer comprising a nonlinear optically active side chain polymer with NLO-chromophores having an N-donor-delocated $\pi$ system-acceptor structure, the N-donor not being bonded directly to alkyl groups. There are two ways to create NLO-chromophores with N-donors which do not have adjacent linear alkyl groups: The first way is to bond one or two aromatic groups. The N-atom is further bonded to the delocated $\pi$ system. If only one aromatic group is present, the N-atom is, besides the delocated system, further bonded to a hydrogen or deuterium atom. The second way of avoiding adjacent alkyl groups is to employ an N-donor moiety wherein no adjacent linear alkyl groups are present.

8 Claims, 8 Drawing Sheets

102 DEGRADATION MODEL PTL LAMP

ELECTRO-OPTICAL DEVICE STABLE IN THE 600-1600 NANOMETER WAVELENGTH RANGE

The present invention is in the field of electro-optical devices, more particularly, electro-optical devices with a layered structure in which an polymer active layer is sandwiched between two cladding layers having a lower index of refraction than the active layer. The active layer comprises a non-linear optically active (NLO) side chain polymer with non-linear optically active (NLO) chromophores. In optical devices usually light in the wavelength range of 1250-1600 nm is employed. Electro-optical devices should also be suitable for use of light in that wavelength range. However, the known NLO polymers appear to be unstable when light in specific windows within the wavelength range of 600-1600 nm is guided through an electro-optical device comprising said NLO polymer in the active layer. This results in increased insertion loss and, for instance, splitters become asymmetrical.

The present invention provides an electro-optical device comprising NLO polymer in the active layer with improved stability for light in the wavelength range of 600-1600 nm is guided through the device.

The present invention is directed to an electro-optical device comprising two cladding layers and an active layer sandwiched between these cladding layers, with the active layer comprising a non-linear optically active side chain polymer with NLO-chromophores having an N-donor-delocated π system-acceptor structure, the N-donor not being bonded directly to alkyl groups.

It is thought that the NLO polymers are photochemically damaged by the singlet oxygen formed by the direct absorption of light with wavelengths of approximately 570 nm, 630 nm, 770 nm, 1060 nm and 1270 nm by $^3O_2$, which is inevitably present in the polymer material of the active layer. These absorption bands happen to correspond to the wavelengths of lasers frequently used in the optical field so that the forming of singlet oxygen is virtually unavoidable. We found that NLO-chromophores with an N-donor are attacked by singlet oxygen at linear alkyl groups adjacent to the N-atom. By using N-donors which do not have linear, i.e. not within a ringstructure, alkyl groups bonded directly to the N-atom, an electro-optical device can be obtained which appears to have increased stability to light in the wavelength range of 600-1600 nm.

There are two ways to create NLO-chromophores with N-donors which do not have adjacent linear alkyl groups:
The first way is to bond one or two aromatic groups. The N-atom is further bonded to the delocated π system. If only one aromatic group is present, the N-atom is, besides the delocated system, further bonded to a hydrogen or deuterium atom.

The second way of avoiding adjacent alkyl group sis to employ an N-donor moiety wherein no adjacent linear alkyl groups are present, such as:

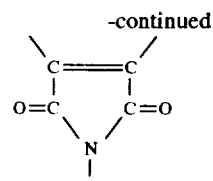
formula 1

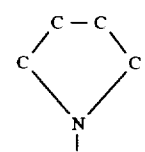
formula 2

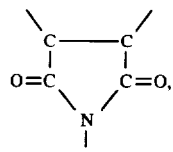
formula 3

The N-donor can be suitably bonded to aromatic groups, which are independently chosen from the formulae:

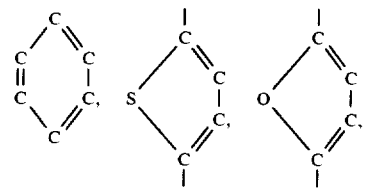

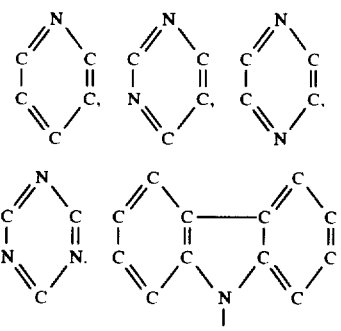

In *J. Am. Chem. Soc.*, 115 (1993), 12599-12600 and in *SPIE Proc.*, Vol. 2143 (1994), 2-13 various N-donor chromophores are described, including those having phenyl groups bonded directly to the N-donor. It is mentioned that the substitution of aromatic moieties for aliphatic ones increases the thermal stability. The non-linear susceptibilities of the chromophores were determined in chloroform solution at 1907 nm and the µβ was calculated at 1300 nm. This publication only mentions chromophores which are not incorporated into a polymeric matrix. Further, no waveguides were made and no µβ measurements were taken at 1300 nm. The singlet oxygen degradation effects were mentioned. This indicates that the problem of photo-instability at 1250-1600 nm was not recognised here, nor was it encountered in practice as no waveguides were tested at 1300 nm.

Older literature on singlet oxygen reactions with amines, for instance Gordon and Gregory, *Organic Chemistry in Color*, p. 289, refers to photo-oxidation if chromophores induced by UV- or visible light. In many publications this process is also referred to as photofading, while the stability established through illumination experiments using UV- and visible light is referred to as light fastness. All these reactions involve in particular the interaction of excited chromophores with $^3O_2$ or $^3O_2$ or, in general, both at the same time, in photo-oxidative processes in excited chromophore is the reactant; most chromophores, and in particular NLO chromophores, are characterised by a completely changed distribution of the electron density in the excited state as compared with the ground state. In strong NLO chromophores almost complete charge separation occurs in the excited state. Reactions of NLO chromophores in the excited state therefore strongly differ from ground state reactions. We have found that the degradation of NLO polymers in electro-optical devices is due to a reaction of ground state NLO chromophores with the singlet oxygen formed by direct excitation of the $^3O_2$ present in the polymer. Therefore, from the literature on photofading no conclusions can be drawn as to the photochemical stability of electro-optical devices to light in the wavelength range 600–1600 nm.

As was mentioned above, NLO side chain polymers have NLO chromophores with an N-donor-delocated π system-acceptor structure. Suitable delocated-π-systems are listed below.

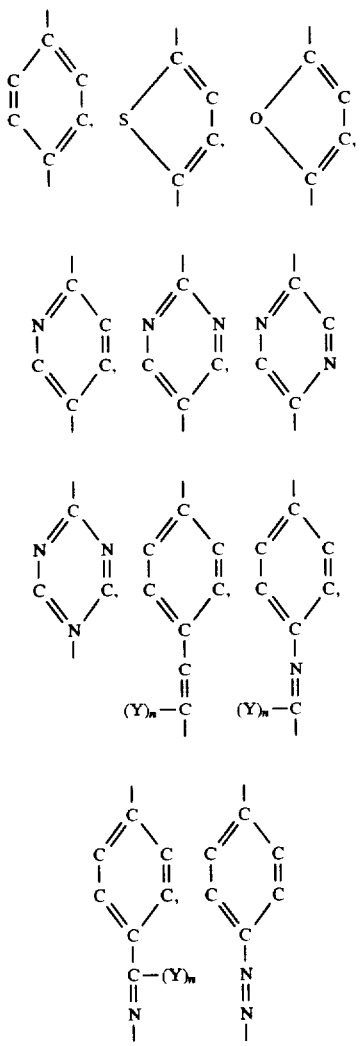

wherein n is 0 or 1 and Y represents —CN, or halogen.

Of these, the short delocated π-systems are preferred, because they are not liable to attack by singlet oxygen. Further, short NLO chromophores are desirable because they are readily polable. The longer delocated π systems can be made more resistant to singlet oxygen attack by introducing a small electron acceptor onto the double bond.

The NLO chromophores further comprise an acceptor group. These acceptor groups are known in the art and need no further elucidation here. Preferred strong acceptor groups are —NO$_2$, —CN, tricyanovinylidene, —CF$_3$, SO$_2$R (R being an alkyl having 1–4 carbon atoms), dicyanovinylidene, barbiturate groups, thiobarbiturate groups and groups according to the formula:

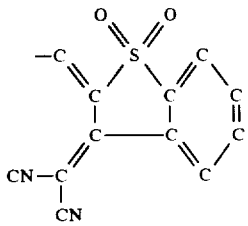

The NLO chromophore is bonded as a side group to the polymer main chain. Suitable main chains are polycarbonates, polyesters, polyurethanes, polyacrylates, polyimides, polyarylates, polyureas, polyethers.

It is further possible to incorporate stabilisers to remove the singlet oxygen out of the polymeric material. Suitable stabilisers are: olefinic material such as β-carotene and carotenoids, amines such as DABCO, diazabicyclo|2.2.2.| octane and organometallic compounds in particular NI(II)-, Fe(II,III)-, Bi(II)-, Co(II)-, Zn(II)- and Pd(II)-complexes.

Polycarbonates are preferred because of their low light loss in the wavelength range of 600–1600 nm. If the NLO chromophores are to be incorporated into a polycarbonate main chain, they have to be hydroxy-functionalised. This can be done by using either dihydroxy-functionalized aromatic groups or moieties according to formulae 1, 2 and 3, or by using OH-groups which are bonded to the aromatic groups or moieties according to formulae 1, 2 and 3 via spacers. For the preparation of NLO polycarbonates reference may be had to EP-A1-0645413, European patent application No. 95201761.4, European patent application No. 95200598.1, and U.S. Pat. No. 5,208,299.

For cladding material it is not necessary to use NLO polymers. Any type of material which has a suitable index of refraction (lower than that of the active layer material) and physical properties comparable to those of the active layer material can be used. Usually the known optical polymers are suitable. In order to set the indices of refraction very accurately and obtain a device with low light loss, more than two cladding layers can be used in the device. For the general preparation procedures for electro-optical devices, and more particularly, electro-optical devices with a 5-layered structure, reference may be had to European patent application No. 95201762.2. This reference also gives examples of suitable cladding material, such as polycarbonates, polyarylates, polyimides, polyureas, polyesters, polyethers, polyurethanes and polyacrylates.

The present invention is further directed to a method for the preparation of an electro-optical device which is stable in the wavelength range of 600–1600 nm. The preparation comprises the steps of:

applying a cladding layer onto a substrate,
applying an active layer onto the cladding layer,
defining a channel pattern in the active layer,
poling the NLO-polymer of the active layer,
applying a cladding layer onto the active layer,
applying pads and electrodes onto the cladding layer.

The sequence some of the steps listed here may be changed when desired.

The substrate usually employed is silicon. The various layers can be applied by spincoating. In order to be able to spincoat layer-on-layer, it is often necessary to cross-link one layer before applying the next layer. Therefore, the cladding material and the NLO polymer are preferably rendered cross-linkable either by the incorporation of cross-linkable monomers or by mixing cross-linkers such as polyisocyanates, polyepoxides, polymaleimides etc. into the polymer. The poling is usually effected by exposing the polymeric material of the active layer to electric (DC) voltage, the so-called poling field, with such heating as will render the polymeric chains sufficiently mobile for orientation.

The channel pattern in the active layer may be defined by shaping the active layer or the cladding layers by etching techniques. These techniques are known to the artisan and need no further elucidation here. The electrodes are usually made of gold and/or other material such as chromium, copper, platinum or combinations or alloys thereof.

The invention will be further elucidated with reference to the following unlimitative examples.

EXAMPLES

For the formulae of the compounds and the reaction mechanisms readers are referred to FIG. 6a–c.

Example 1

Synthesis of 4-(dihydroxyethylamino)-4'-nitrostilbene (DANS)

For synthesis see EP patent 0 350 112-A1. $\lambda$max=437 nm, $\mu\cdot\beta(o)$=416. $10^{-48}$ e.s.u. (in chloroform). The polymerisation is described in EP-A1-0 645 413.

Example 2

Synthesis of 4-(diphenylamino)-4'-nitrostilbene (DPANS)

Step 1:
4-(diphenylamino)benzaldehyde (17) triphenylamine was converted into 4-(diphenylamino)benzaldehyde by a Vilsmeier reaction[1]. To stirred N,N-dimethylformamide (20 ml) was added in 10 min POCl$_3$ (5 ml) at 0° C., and the mixture was stirred for 1 hour at room temperature. After the mixture was added to a stirred suspension of triphenylamine (9.80 g, 40.0 mmoles) in dimethylformamide (20 ml), the temperature was raised to 70° C. for 90 min. After cooling, the reaction mixture was poured into a sodium acetate solution in water (0.18M, 250 ml) and extracted with dichloromethane (3*50 ml). The separated organic layer was washed 6 times with water, dried (MgSO$_4$), and discoloured (silica gel 60). The solvent was evaporated under reduced pressure to yield solid product (9.69 g, 89%), which was used without further purification.

[1] Pizey, *Synthetic Reagents*, Vol. 1 (1974), pp. 1–99.

Step 2:
To NaH (2.13 g, 60 mmoles, 60% suspension in oil) in 10 ml of DMF was slowly added a solution of 4-diphenylaminobenzaldehyde (12 g, 44 mmoles), diethyl 4-nitrobenzyl phosphonate (12 g, 44 mmoles) in 150 ml DMF. The mixture was stirred overnight at room temperature and then poured into 1 l of water. The solids were filtered off and washed with water. The solids were dissolved in dichloromethane, washed with brine, and dried (MgSO$_4$). After evaporation of the solvent, the product was purified by column chromatography (silica, dichloromethane as eluent). 11.8 g of (N,N-diphenylamino)-4'-nitrostilbene were obtained (68%). $\lambda$max=405 nm, $\mu\cdot\beta(o)$=313. $10^{-48}$ e.s.u. (in chloroform).

[1] C. R. Moylan, R. J. Twieg, V. Y. Lee, S. A. Swanson, K. M. Betterton, and R. D. Miller, *J. Am. Chem. Soc.* 115, (1993), 12599–12600.

Polymers containing the DPANS chromophore can be synthesised in accordance with the preparation of the TCVDPA polycarbonates and the NTPA polycarbonate.

Example 3

Synthesis of 4-(3,4-dihydroxypyrrolidin-1-yl)-4'-nitrostilbene (PYNS)

For synthesis see patent PCT/EP 93/01587. $\lambda$max=428 nm, $\mu\cdot\beta(o)$=236. $10^{-48}$ e.s.u. (in chloroform).

The polymerisation was carried out by the dropwise addition, at 0° C., of 1.03 ml pyridine in 5 ml THF to a solution of 2.95 g hexafluorobisphenol A bischloroformate and 2.08 g PYNS-diol in 40 ml THF. After the addition the mixture was allowed to heat to room temperature. After stirring overnight, the mixture was precipitated in 450 ml methanol. After filtration and washing with methanol 3.05 g (67%) of polymer were obtained. Mw 3700.

Example 4

Synthesis of 4-(N-phenylamino)-4'-nitroazobenzene 4-(N-phenylamino)-4'-nitroazobenzene is commercially available from ACROSS Chimica, Aldrich, or Sigma. $\lambda$max=453 nm, $\mu\cdot\beta(o)$=274. $10^{-48}$ e.s.u. (in chloroform).

Polymers containing the above-mentioned chromophore can be synthesised in accordance with the preparation of the TCVDPA polycarbonates.

Example 5

Synthesis of 4-(diethanolamino)-tricyanovinyl Benzene (TCVDEA)

The synthesis of 4-(diethanolamino)-tricyanovinyl benzene is described in European patent application No. 95200598.1. $\lambda$max=515 nm, $\mu\cdot\beta(o)$=306. $10^{-48}$ e.s.u. (in chloroform).

The polymerisation of 4-(diethanolamino)-tricyanovinyl benzene with the bischloroformate of 4,4'-(hexafluoroisopropylidene)diphenol is described in European patent application No. 95200598.1.

Example 6

Synthesis of 4-tricyanovinyl-4'-(2-hydroxymethyl-3-hydroxypropyl)triphenylamine (TCVDPA-1) (23)

Step 1:
4-[2-(methylmethanoate)methylpropenoate]triphenylamine (18)

4-[2-(methylmethanoate)methylpropenoate]triphenylamine was prepared by a Knoevenagel reaction of 4-diphenylaminobenzaldehyde and dimethyl malonate-1, 2.[1,2] A solution of 4-diphenylaminobenzaldehyde (8.00 g, 29.3 mmoles), dimethyl malonate (3.90 g, 29.5 mmoles), and piperidine (1.6 ml) in benzene (150 ml) was refluxed at 80° C. under a blanket of N$_2$. The released water was collected by a Dean-Stark separator filled with molecular sieve. After 24 hours TLC showed that the starting material had not undergone complete reaction, a situation which was not changed by an extra addition of piperidine or dimethyl malonate. After cooling, the mixture was washed with water (2*50 ml), 1N HCl (2*50 ml), and saturated solution of NaHCO$_3$ (100 ml). The organic layer was dried and the solvent was evaporated under reduced pressure to give an oil (11.6 g) which could be chromatographed (silica gel 60, dichloromethane) to yield pure 4-|2-(methylmethanoate) methylpropenoate|triphenylamine (14%, oil). However, because purification is easier after the next reaction step, the crude oil was used without purification.

[1] C. F. H. Allen and F. W. Spangler, Org. Synth. Vol. 25 *(1945), 42–44.
[2] Jones, Org. React. 15 (1967), 204–599.

Step 2:

4-|2-(methylmethanoate)methylpropanoate| triphenylamine (19)

4-|2-(methylmethanoate)methylpropanoate| triphenylamine was prepared by catalytic hydrogenation of 4-|2-(methylmethanoate)methylpropenoate|triphenylamine (18). Crude 4-|2-(methylmethanoate)methylpropenoate| triphenylamine (11.6 g) with palladium on activated carbon (1.55 g, 5% Pd) in ethyl acetate was hydrogenated until $H_2$ absorption stopped. After the mixture was filtered through a double fluted filter paper and the ethyl acetate was removed by evaporation under reduced pressure, the solid was chromatographed (silica gel 60, dichloromethane) to yield 0.2 g (26%) of solid 4-methyltriphenylamine and 7.29 g (64%) of 4-|2-(methylmethanoate)methylpropanoate|triphenylamine.

Step 3:

4-(2-hydroxymethylpropanol)triphenylamine (20)

4-(2-hydroxymethylpropanol)triphenylamine was synthesized by selective reduction[1] of the ester groups of 4-|2-(methylmethanoate)methylpropanoate|triphenylamine (19) with $NaBH_4$. To a refluxing mixture of diester 19 (1.00 g, 2.57 mmoles) and $NaBH_4$ (0.25 g, 6.58 mmoles) in t-BuOH (40 ml) methanol (12.0 ml) was added in 1 hour. After an additional 3 hours of refluxing the reaction was completed according to TLC. To remove most t-Bu the mixture was cooled, methanol (2×150 ml) was added, and the solvents were removed under reduced pressure. The solid was dissolved in ethyl acetate (50 ml) and washed with 1N HCl, water (2×), and brine. The organic layer was dried ($MgSO_4$) and evaporated under reduced pressure to yield crude 4-(2-hydroxymethyl)propanol)triphenylamine (20, 0.81 g, 95%), which was used without purification.

[1] K. Soai, H. Oyamada, and A. Ookawa, Synth. Communications 12(6) (1982), 463–467.

Step 4:

4|(2-acetoxymethyl)-3-acetoxypropyl|triphenylamine (21)

Because the reaction of 4-(2-hydroxymethylpropanol) triphenylamine with tetracyanoethene led to a mixture of products, 4-|(2-acetoxymethyl)-3-acetoxypropyl| triphenylamine was prepared to protect the hydroxyl groups. In acetic anhydride (250 ml) 4-(2-hydroxymethylpropanol) triphenylamine (36.0 g, 108 mmoles) was refluxed for 4 hours. After the mixture was cooled, the acetic acid and excess acetic anhydride were removed by evaporation under reduced pressure and the resulting tar was chromatographed (silica gel 60, dichloromethane) to yield an oil (37.2 g, 87%) which crystallized very slowly.

Step 5:

4-tricyanovinyl-4'-|(2-acetoxymethyl)-3-acetoxypropyl| triphenylamine (22)

4-tricyanovinyl-4'-|(2-acetoxymethyl)-3-acetoxypropyl| triphenylamine was prepared 4-|(2-acetoxymethyl)-3-acetoxypropyl|triphenylamine (21) with tetracyanoethane.[1] The reaction of tetracyanoethane (11.6 g, 90.6 mmoles) with 4|(2-acetoxymethyl)-3-acetoxypropyl|triphenylamine (20.1 g, 48.2 mmoles) in N,N-dimethylformamide (25 ml) was not completed after 2.5 days of reaction at room temperature. Neither extending the reaction time (4 days), nor raising the temperature (80° C.), nor changing the solvent (pyridine) improved the degree of conversion. After the addition of dichloromethane (250 ml), the mixture was washed with water (3×) and brine, and after drying ($MgSO_4$) the solvent was evaporated under reduced pressure. Because the starting material and product (22) could not be separated easily by chromatography or recrystallisation, the crude product was hydrolysed first.

[1] B. C. McKusick, R. E. Heckert, T. L. Cairns, D. D. Coffman, and H. F. Mower, J. of Am. Chem. Soc. Vol. 80 (1958), 2806–2815.

Step 6:

4-tricyanovinyl-4'-(2hydroxymethyl-3-hydroxypropyl) triphenylamine (23)

4-tricyanovinyl-4'-(2hydroxymethyl-3-hydroxypropyl) triphenylamine was synthesised from 4-tricyanovinyl-4'-|(2-acetoxymethyl)-3-acetoxypropyl|triphenylamine by de-acetone in methanol (500 mol) with concentrated HCl (60 ml) was refluxed for 6 hours, whereupon the mixture was cooled. After the methanol/HCL was evaporated under reduced pressure, the product was dissolved in dichloromethane and was washed with water (1×), saturated $NaHCO_3$ solution (1×), and water (3×). The organic layer was dried ($MgSO_4$), and the dichloromethane was removed by evaporation under reduced pressure. The crude solid was chromatographed (silicagel 60, ethyl acetate/n-hexane 80:20) and recrystallised from methanol to yield the product (23, 2.94 g, 14.1%). λmax=534 nm, μ·β(o)=511. $10^{-48}$ e.s.u. (in chloroform).

Polymerisation

To a mixture of 2.50 g of 4-tricyanovinyl-4'-(2-hydroxymethyl-3-hydroxypropyl)triphenylamine (23) and 2.66 g of hexafluorobisphenol A bischloroformate in 25 ml dichloromethane at 0° C. was added dropwise 0.94 ml of pyridine in 10 ml dichloromethane. After the addition the mixture was heated to room temperature and stirred overnight. The polymer was precipitated in 550 ml of methanol, washed several times with methanol, and dried at 40° C. under vacuum.

Example 6

Synthesis of 4-tricyanovinyl-4'-(2,3-dihydroxypropoxy)triphenylamine (TCVDPA-2) (28)

Step 1:

4-hydroxytriphenylamine (24)

4-hydroxytriphenylamine (5) was converted into 4-hydroxytriphenylamine (24) with boron tribromide in chloroform.[1] A solution of boron tribromide (15 ml, 165 mmoles) in chloroform (50 ml) was added dropwise to a stirred solution of 5 (30.0 g, 109 mmoles) at room temperature (exothermic, ice). After 1 hour the reaction was carefully quenched (ice cooling) with methanol (50 ml), and the solvents were removed under reduced pressure. Six times methanol (25 ml) was added and removed under reduced pressure. The residue was dissolved in dichloromethane and washed with a saturated $NaHCO_3$-solution. The organic layer was dried ($MgSO_4$) and evaporated under reduced pressure, whereupon the residue was chromatographed (silicagel 60, dichloromethane), passing through a short column to give crystalline 24 (27.85 g, 98%).

[1] K. C. Rice, J. Med. Chem. 20 (1977), 164.

Step 2:

4-(2,2-dimethyl-1,3-dioxolane-4-methoxy) triphenylamine (26)

4-(2,2-dimethyl-1,3-dioxolane-4-methoxy) triphenylamine (26) was prepared by reaction of 24 with the solketal mesylate (25). A suspension of 24 (27.6 g, 106 mmoles), solketal mesylate 25 (27.6 g, 131 mmoles), NaOH (5.1 g, 128 mmoles), $K_2CO_3$ (7.3 g, 5.3 mmoles) in N,N- dimethylacetamide (250 ml) was heated to 140° C. for 3 hours under nitrogen. After the mixture was allowed to cool, water (250 ml) was added and it was extracted with ether (3×100 ml). The organic layer was washed with water (3×) and brine, and dried (MgSO$_4$). The ether was evaporated in vacuo and the residue was chromatographed (silicagel 60, ethyl acetate:n-hexane 5/95) to give 26 as an oil (29.8 g, 76%) which crystallized after trituration with methanol.

Step 3:

4'-tricyanovinyl-4-(2,2-dimethyl-1,3-dioxolane-4-methoxy)triphenylamine (27)

4'-tricyanovinyl-4-(2,2-dimethyl-1,3-dioxolane-4-methoxy)triphenylamine (27) was synthesised by reaction of 27 with tetracyanoethane.[1] Tetracyanoethane (3.5 g, 27 mmoles) and 27 (9.00 g, 24.0 mmoles) in N,N-dimethylformamide (20 ml) and pyridine (5 ml) were reacted for 8 days at room temperature. The mixture was precipitated in methanol:water (300 ml, 50/50), which gave an oil. The decanted mother liquor was extracted with ether (3*75 ml), and after combination of the oil and the ether, the organic layer was dried and evaporated under reduced pressure. The residue was chromatographed (silicagel 60, ethyl acetate:n-hexane 5/95) to yield 27 as an oil (9.6 g, 84%).

[1] B. C. McKusick, R. E. Heckert, T. L. Cairns, D. D. Coffman, and H. F. Mower, *J. of Am. Chem. Soc.* Vol. 80 (1958), 2806–2815.

Step 4:

4-tricyanovinyl-4'-(2,3-dihydroxypropoxy) triphenylamine (28)

4-tricyanovinyl-4'-(2,3-dihydroxypropoxy) triphenylamine (28) was prepared by hydrolysing the ketal group of 27. Starting material 27 (9.6 g, 20 mmoles), water (50 ml), and concentrated HCl (50 ml) in methanol (1000) were refluxed for 3 hours. After cooling the solution was evaporated in vacuo, whereupon the product precipitated and was filtered off. The residue was washed three times with water and recrystallised from methanol to give brilliant green needles of 28 (6.95 g, 79%). 28: M.p.: 110.8°–112.8° C. λmax=538 nm, μ·β(o)=584. 10$^{-48}$ e.s.u. (in chloroform, methoxy compound).

Polymerisation

To a mixture of 1.50 g of monomer (28) and 2.67 g of hexafluorotetrabromobisphenol A bischloroformate in 30 ml THF at 0° C. was added dropwise 0.55 ml of pyridine in 2 ml THF. After the addition the mixture was allowed to heat to room temperature and stirred overnight. The mixture was precipitated in 350 ml methanol, filtered, and washed several times with methanol. Filtration and drying yielded 2.51 g (64%), Mw 3000.

Example 7

Synthesis of 4,4'-dihydroxy-4"-nitro-triphenylamine (NTPA)

Step 1:

benzyl 4-iodophenyl ether 4-iodoanisole (10.12 g, 0.046 mole), benzyl bromide (8.00 g, 0.046 mole), and potassium carbonate (6.31 g, 0.046 mole) in acetone (20 ml) were refluxed for 24 hours. Water was added and the aqueous layer extracted with ether (3×100 ml). The combined organic layers were washed with 2M NAOH (2×150 ml) and dried over anhydrous potassium carbonate. Evaporation of the solvent followed by crystallisation from methanol yielded 12.57 g (88%) benzyl 4-iodophenyl ether.

Step 2:

4,4'-dibenzyloxy-4"-nitrotriphenylamine

Benzyl 4-iodophenyl ether (10.54 g, 0.034 mole), 4-nitroaniline (1.54 g, 0.011 mole), potassium carbonate (11.87 g), copper powder (2.71 g), 18-crown-6 (0.75 g) were refluxed in 30 ml of o-dichlorobenzene for 24 hours. The mixture was filtered, the salts were washed with ether, and the solvents of the combined organic filtrates were evaporated. The residue was purified over silica with dichloromethane as eluent. After evaporation of the solvent, the product was recrystallised from ethanol. The yield was 4.08 g (73%).

Step 3:

4,4'-dihydroxy-4"-nitrotriphenylamine 4,4'-dibenzyloxy-4"-nitrotriphenylamine (14.15 g, 0.028 mole) was dissolved in 150 ml of trifluoroacetic acid and stirred for 72 hours under nitrogen. The trifluoroacetic acid was evaporated and the residue purified by column chromatography over silica (eluents dichloromethane/methanol 95:5). The solvents were evaporated and the product was crystallised from chloroform. The yield was 1.58 g (17%). λmax=410 nm, μ·β(o)=98. 10$^{-48}$ e.s.u. (in chloroform, diacetoxy compound).

Polymerisation of 4,4'-dihydroxy-4"-nitrotriphenylamine (1.53 g) with the bischloroformate of 2,2',6,6'-tetrabromo-4,4'-(hexafluoroisopropylidene)diphenol (3.75 g) in THF (30 ml) was carried out by the dropwise addition of pyridine (0.74 g) in THF (5 ml) at 0° C. After the addition, the mixture was heated to room temperature and stirred overnight. The polymer was precipitated in methanol and washed several times with methanol. The yield was 3.51 g (72%). Mw=6000, Tg=168°–185° C., Tdec.>220° C.

Example 8

Synthesis of N,N-diphenyl-4-(dicyanovinyl)aniline (DPDCVA)

4-(N,N-diphenylamino)benzaldehyde (2.46 g, 9.0 mmoles), malonitrile (0.62 g, 9.4 mmoles), and two drops of piperidine were dissolved in 40 ml of absolute ethanol. The mixture was refluxed for 2 hours and cooled, and the solids were filtered off. Recrystallisation of the residue from absolute ethanol gave pure N,N-diphenyl-4-(dicyanovinyl) aniline (1.34 g, 4.2, 46%). λmax=442 nm, μ·β(o)=228. 10$^{-48}$ e.s.u. (in chloroform).

Polymers containing the above-mentioned chromophore may be synthesised in accordance with the preparation of the TCVDPA polycarbonates and the NTPA carbonate.

Example 9

Synthesis of 1-(3,4-dihydroxypyrrolidin-1-yl)-4-(tricyanovinyl)benzene (PYTCVB)

The synthesis of 1-(3,4-dihydroxypyrrolidin-1-yl)-4-(tricyanovinyl)benzene is described in European patent application No. 95200598.1. λmax=525 nm, μ·β(o)=377. 10$^{-48}$ e.s.u. (in chloroform).

The polymerisation of 1-(3,4-dihydroxypyrrolidin-1-yl)-4-(tricyanovinyl)benzene with the bischloroformate of 4,4'-(hexafluoroisopropylidene)diphenol is described in the above-mentioned patent application.

Example 10

Synthesis of 1-[2",4'-(5"-tricyanovinylthienyl) phenyl]pyrrolidine (TCVTPP) (15)

Step 1:

1-(4'-iodophenyl)pyrrolidine (12)

1-(4'-iodophenyl)pyrrolidine (12) was prepared by iodination of 1-phenylpyrrollidine with benzyltrimethyl ammonium dichloroiodate[1] (11). Benzyltrimethyl ammonium dichloroiodate was synthesised by the dropwise addition of an aqueous (100 ml water) solution of benzyltrimethyl ammonium chloride (18.6 g, 100 mmoles) to a stirred solution of ICl (16.2 g, 100 mmoles) in dichloromethane (200 ml) at room temperature. After the mixture was stirred for 30 min., the dichloromethane layer was separated and dried ($MgSO_4$) and then evaporated in vacuo to give a residue which was recrystallised in dichloromethane-ether (4:1), giving 11 as brilliant yellow needles (18.23 g, 60%); mp.: 126°–127° C. (lit.[1] 125°—125° C.).

[1] S. Kajigaeshi, T. Kakinami, H. Yamasaki, S. Fujisaki, and T. Okamoto, *The Chem. Soc. of Japan* Vol. 61 (2) (1988), 600–602.

1-(4'-iodophenyl)pyrrolidine (12) was prepared by adding 11 (1.19 g, 3.42 mmoles) and calcium carbonate (0.44 g) to a solution of 1-phenylpyrrolidine in dichloromethane (50 ml)-methanol (20 ml). The mixture was stirred for a weekend, during which $CO_2$ was gradually released. Excess calcium carbonate was filtered off and the filtrate was concentrated. To the obtained residue was added an aqueous $NaHCO_3$ solution (5%, 20 ml), and the mixture was extracted with ether (4*40 ml). The ether layer was dried ($MgSO_4$) and evaporated under reduced pressure, whereupon the solid was recrystallised from methanol to give 12 as colourless plates (0.56, 61%). 12: M.p. 99.7°–99.8° C.

Step 2:

1-(2",4'-thienylphenyl)pyrrolidine (13)

1-(2",4'-thienylphenyl)pyrrolidine (13) was synthesised by the Pd[0]catalysed coupling reaction between 2-thienyl zinc chloride and 1-(4'-iodophenyl)pyrrolidine (12). Thiophene (2.30 g, 36.6 mmoles) was dissolved in anhydrous tetrahydrofuran (10 ml, molecular sieve) and cooled in an ice bath. The thiophene was lithiated by the dropwise addition of a 1.6M n-butyllithium solution (10.0 ml, 16 mmoles) under argon at 0° C. The mixture was stirred for 30 minutes and was then added, via an double-ended needle, to a stirred solution of dry zinc chloride (1.84 g, 18.2 mmoles) in dry tetrahydrofuran (10 ml) at room temperature, whereupon the mixture was stirred for a further hour.

The 2-thienyl zinc chloride (14) was then added via a syringe to a solution of 12 (2.50 g, 9.16 mmoles) and Pd[0]$(P(C_6H_5)_3)_4$ (0.025 g) in dry tetrahydrofuran (25 ml) under argon. The temperature was then slowly raised to 50° C. and the mixture was stirred at that temperature for 2 hours.

After cooling the mixture was precipitated in waster and filtered, and the residue was dried in vacuo on KOH. The dry solid was dissolved in ether, and after the insoluble material was filtered off and the ether removed under reduced pressure, the residue was recrystallised from acetone to yield 13 (1.08 g, 52%).

Step 3:

1-|2",4'-(5"-tricyanovinylthienyl)phenyl|pyrrolidine (15)

1-|2",4'-(5"-tricyanovinylthienyl)phenyl|pyrrolidine (15) was added by reaction of 1-(2",4'-thienylphenyl)pyrrolidine (13) with tetracyanoethene.[1] Tetracyanoethene (0.32 g, 2.5 mmoles) and 21 (0.70 g, 5.46 mmoles) in N,N-dimethylformamide (5 ml)-pyridine (1 ml) were reacted for 2 hours under argon at 50° C. After cooling the solution was precipitated in methanol and filtered, and the residue was recrystallised from acetone to give 15 (0.10 g, 14%). lmax= 645 nm, m.b(o)=1439. $10^{-48}$ e.s.u. (in chloroform).

[1] B. D. McKusick, R. E. Heckert, T. L. Cairns, D. D. Coffman, and H. F. Mower, *J. of Am. Chem. Soc.* Vol. 80 (1958), 2806–2815.

Polymers containing the above-mentioned chromophore can be synthesised in accordance with the method described in Example 3.

Stability measurements

To establish the stability of polymers and monomers towards $^1O_2$, two approaches were used: firstly, the exposure of the materials in solution to in-situ generated $^1O_2$, and secondly, the irradiation of thin films (planar waveguides) of selected polymers by a continuous wave high optical power lasersource in the 1300-nm band region to evaluate the stability of the material under conditions relevant to their actual use. The two types of measurements and their results will be discussed separately below.

Solution studies

Diluted solutions of selected polymers and monomers in deuterated chloroform were exposed to $^1O_2$ generated in situ by one of three approaches: (1) Sensitised formation of $^1O_2$ via irradiation of mesotetraphenylporphin (MTPP) at λ>610 nm; once excited, the sensitiser has an efficient intersystem crossing to the triplet state and a high yield of $^1O_2$ via interaction with $^3O_2$ present in the solution. (2) Formation of $^1O_2$ by the heating of 1,4,5-trimethylnaphthalene endoperoxide (without irradiation). (3) Formation of $^1O_2$ in the gas phase by irradiation of a capillary coated with Rose Bengal, the formed $^1O_2$ being guided into the chloroform solution. The experiments are conducted in deuterated chloroform becaused the $^1O_2$ has a very long lifetime in this solvent (about 300 ms), so that its effects can be established with greater sensitivity. The efficient generation of $^1O_2$ was established either by direct measurement of the $^1O_2$ chemiluminescence at 1276 nm or by quantitative determination of the products of the highly specific 2,3-diphenyl-1,4-dioxene.

Reaction products formed as a result of the interaction of the DANS chromophore and $^1O_2$ were isolated and identified. For a large part they consist of products of the reaction of $^1O_2$ with the dialkylamino part of the molecule (int. al., de-alkylated and formyl-substituted structures). Subsequently, monomers and polymers which do not contain the vulnerable dialkylamino moiety were synthesised.

To screen the stability of the monomers and polymers in solution, both the absorption of the long wavelength charge-transfer transition and (for the polymers) the molecular weight distribution were established. The photochemical stability of electro-optically active side chain polymers has two aspects. Firstly, one has to realise that degradation of the unstable dialkylamino moiety, which is incorporated into the polymer backbone, will lead to the breakdown of the polymer structure, with detrimental consequences for its physical and mechanical properties. Secondly, the reaction of the chromophore with $^1O_2$ results in the disappearance of the charge transfer absorption band, which is directly reflected in the loss of electro-optical activity of the chromophores and, since it is accompanied by a significant reduction of the refractive index of the degraded area, in the loss of waveguiding properties.

FIGS. 1 and 2 show the (relative) stability of a number of investigated materials. The rate of degradation of DANS was taken as reference. Data was derived from the UV-VIS absorption spectra of the deuterated chloroform solutions of the materials, using MTPP as sensitiser. The contribution of the MTPP molecule to the spectral features was corrected. The MTPP was present in the solutions at $1.3 \times 10^{-5}$M, 2–3 times the concentration which was used for the chromophores. In the experiments shown in FIG. 1, for excitation the light emitted by a 100-W Hg-arc lamp was guided through two filters to select the 610–800 nm wavelength region and onto the cuvette through a silica fibre bundle. For FIG. 2 the light emitted from a 75-W quartz-tungsten halogen lamp was used. By optical filtering also the 610–800 nm wavelength range was selected. UV-VIS absorption spectra were recorded for 1-cm path length cuvettes in the 300–800 nm region, using a Cary 3 or Cary 5 spectrophotometer.

The data in FIG. 1 clearly shows that the dialkyl-stilbenes (DANS and PYNS) are significantly less stable than the diaryl-stilbene DPANS. The anilines TCVDPA and TCVDMA, 4-(dimethylamino)-tricyanovinylbenzene, are more stable than DPANS, the diaryl-benzene TCVDPA again being more stable than the dialkylbenzene TCVDMA. No TCVDPA degradation was observed in the solution study.

The data of FIG. 2 illustrate the increased stability of the MPANAB chromophore in comparison with DANS and PYDCVAB, while PYDCVAB appears to be more stable than DANS.

The polymeric materials were analysed by size-exclusion chromatography as well. The data is given in Table 1.

TABLE 1

Degradation of polymeric materials exposed to $^1O_2$.

| Compound | Mp (before) | Mp (after) | reduction of Mp (%)* |
|---|---|---|---|
| DANS-PC[b] | 8000 | 5900 | 26 |
| TCVDEA-PC | 11200 | 8100 | 27 |
| TCVDPA-1-PC | 5600 | 5600 | 0 |
| TCVDPA-2-PC | 2100 | 2100 | 0 |
| PYTCVB-PC | 7000 | 6300 | 10 |

*Exposure to $^1O_2$ via MTPP sensitisation during 3 hours with a quartstungsten halogen lamp. Mp peak measured relative to polystyrene standards.
[b]Structures as described above; PC stands for hexafluorobisphenol-A-based polycarbonate.

Stabilisers

Stabilisers which can be applied to remove reactive $^1O_2$ species from polymeric materials have been described in the literature. Several types of stabilisers are known: (1) olefinic materials, such as β-carotene and carotenoids, (2) amines, such as DABCO, diazabicyclo[2.2.2]octane, and (3) organometallic compounds, in particular Ni(II)-, Fe(II,III)-, Bi(II)-, Co(II)-, Zn(II)-, and Pd(II)-complexes. The efficiency of several of these stabilisers has been investigated via measurement of the decrease of the $^1O_2$ concentration generated by the sensitiser fluorenon in deuterated chloroform solution. DABCO, β-carotene, 2,3-diphenyl-1,3-dioxene, and the Ni-complex Perkacit NDBC all showed a significant reduction of the $^1O_2$ luminescence intensity, indicating their effectiveness in protecting materials against $^1O_2$ induced degradation (see FIG. 3).

Waveguide studies

The photochemical stability at 1319 nm of three different polymers was measured using the standard prism coupling technique. The optical throughput (intensity) of a thin polymer film (planar waveguide configuration) deposited on a silicon oxide on silicon substrate was monitored up to a period of 24 hours. FIG. 4 depicts the results for DANS.PC, a DANS side chain polycarbonate, for TCVDPA-2.PC, a side chain polycarbonate of 4-tricyanovinyl-4'-(2,3-dihydroxypropoxy)triphenylamine, and for a polycarbonate without an electro-optically active side chain. The significant improvement in the stability of the polymer containing the diphenylamino donor group is obvious.

Photochemical degradation of thin polymer films can be observed in the prism coupling set-up as a broadening of the optical mode in the direction perpendicular to the propagation direction and parallel to the plane of the polymeric slab waveguide. The intensity profile of a high optical power laser beam coupled out of the slab waveguide substantially broadens in time when light is propagated through the slab waveguide. This broadening of the intensity profile indicates a reduction of the refractive index due to a photochemically induced change of the polymer. The change of the mode profile in percentage terms is a sensitive indicator of the photochemical stability of the polymer. The addition of stabilisers to the polymer can increase the resistance of the polymer to $^1O_2$ induced oxidative processes, as has been discussed above. To prove the improvement which may be realised by incorporation of a $^1O_2$ scavenger, the Ni(II) based stabiliser Perkacit NDBC was added as a solid solution to the DANS.PC side chain polymer in different percentages. The addition of the Perkacit scavenger resulted in a direct and significant improvement in the stability of the—very unstable—DANS side chain polycarbonate. The effect of the addition of the scavenger is depicted in FIG. 5.

Figure 1:
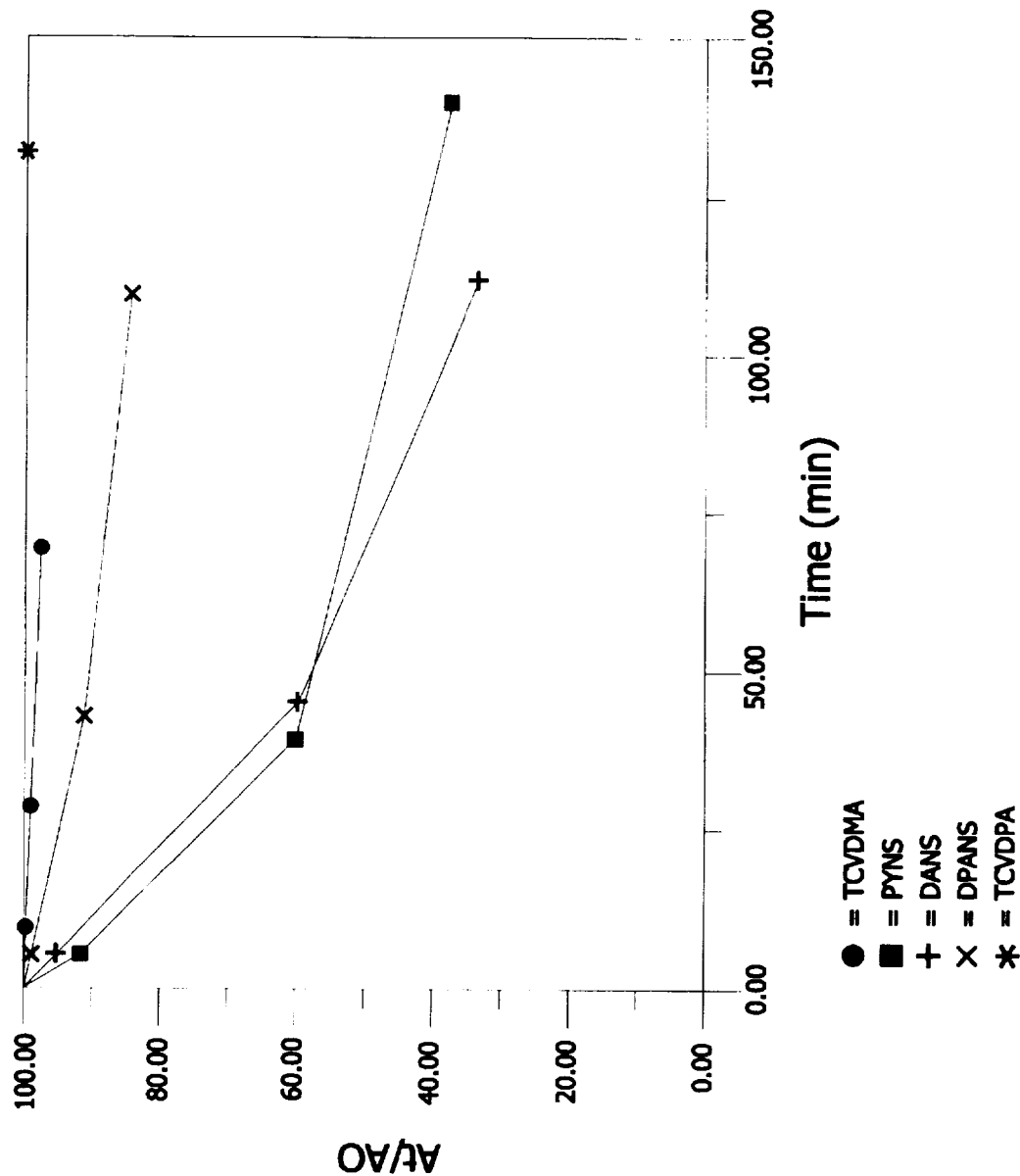
FIG. 1: Solution $^1O_2$ degradation studies for a number of model compounds, showing the significantly higher stability of diarylamino donors.
Figure 2:
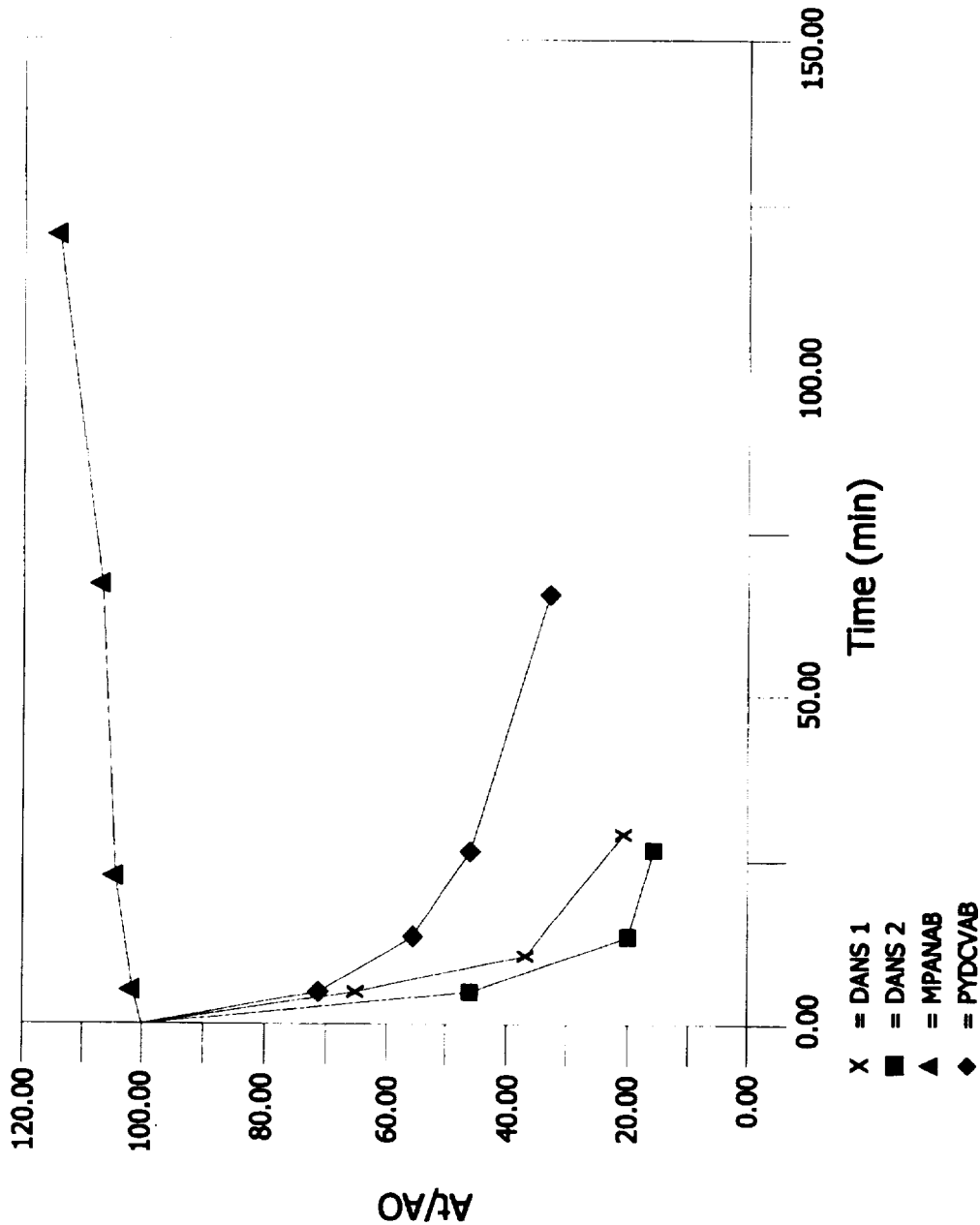
FIG. 2: Solution $^1O_2$ degradation studies for a number of model compounds, showing the higher stability of N-donors bonded both to a delocated π system, an aromatic group and to a hydrogen atom.
Figure 3:
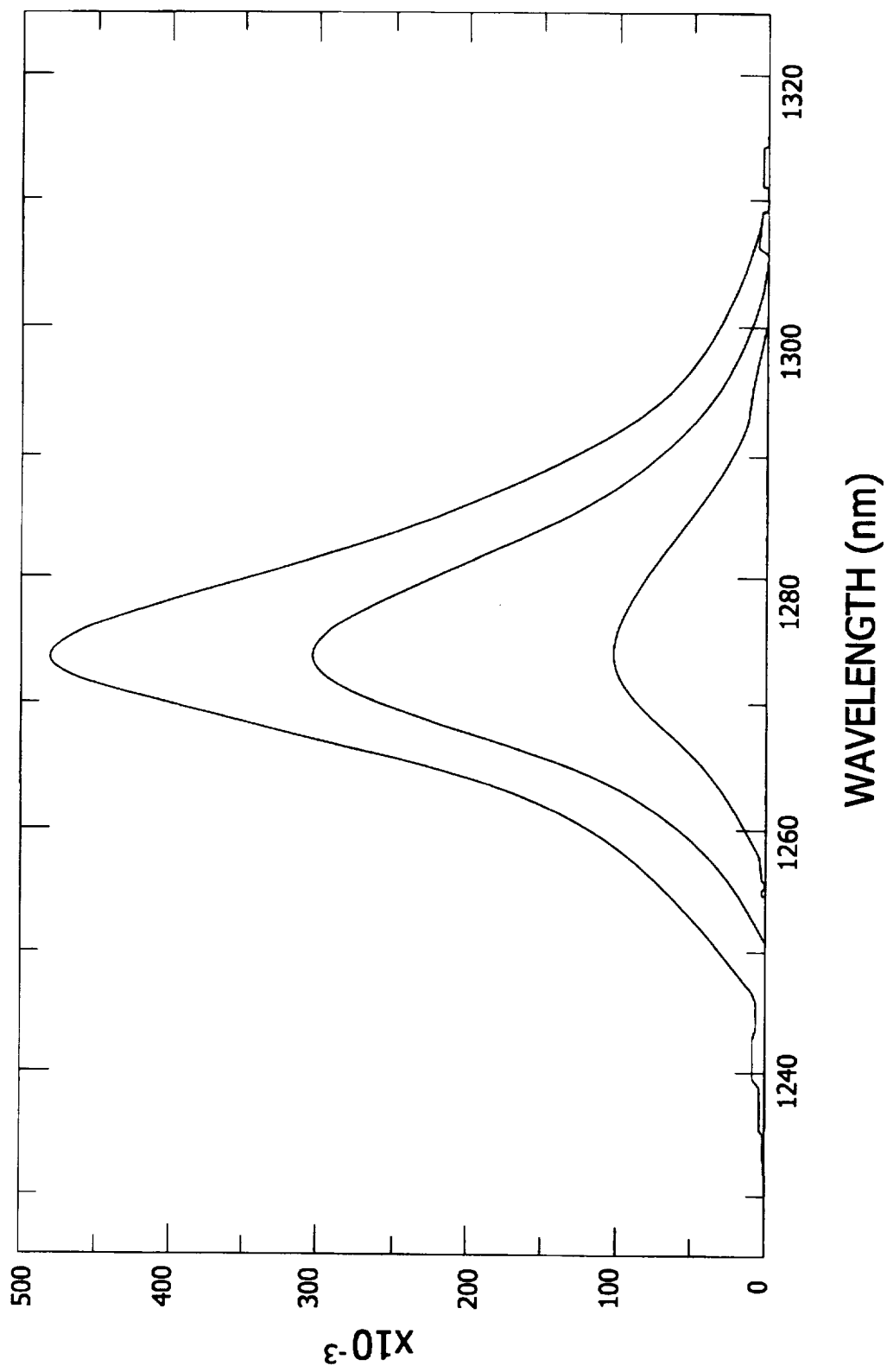
FIG. 3: Efficiency of Perkacit NDBC®, ex Akzo Nobel Chemicals, scavenger shown for $^1O_2$ generated by fluorenon in deuterated chloroform solution. Curves showblank $^1O_2$ signal (top), signal with 0.02 wt. % Perkacit added to the solution, and signal with 0.11 wt. % Perkacit added to the solution.
Figure 4:
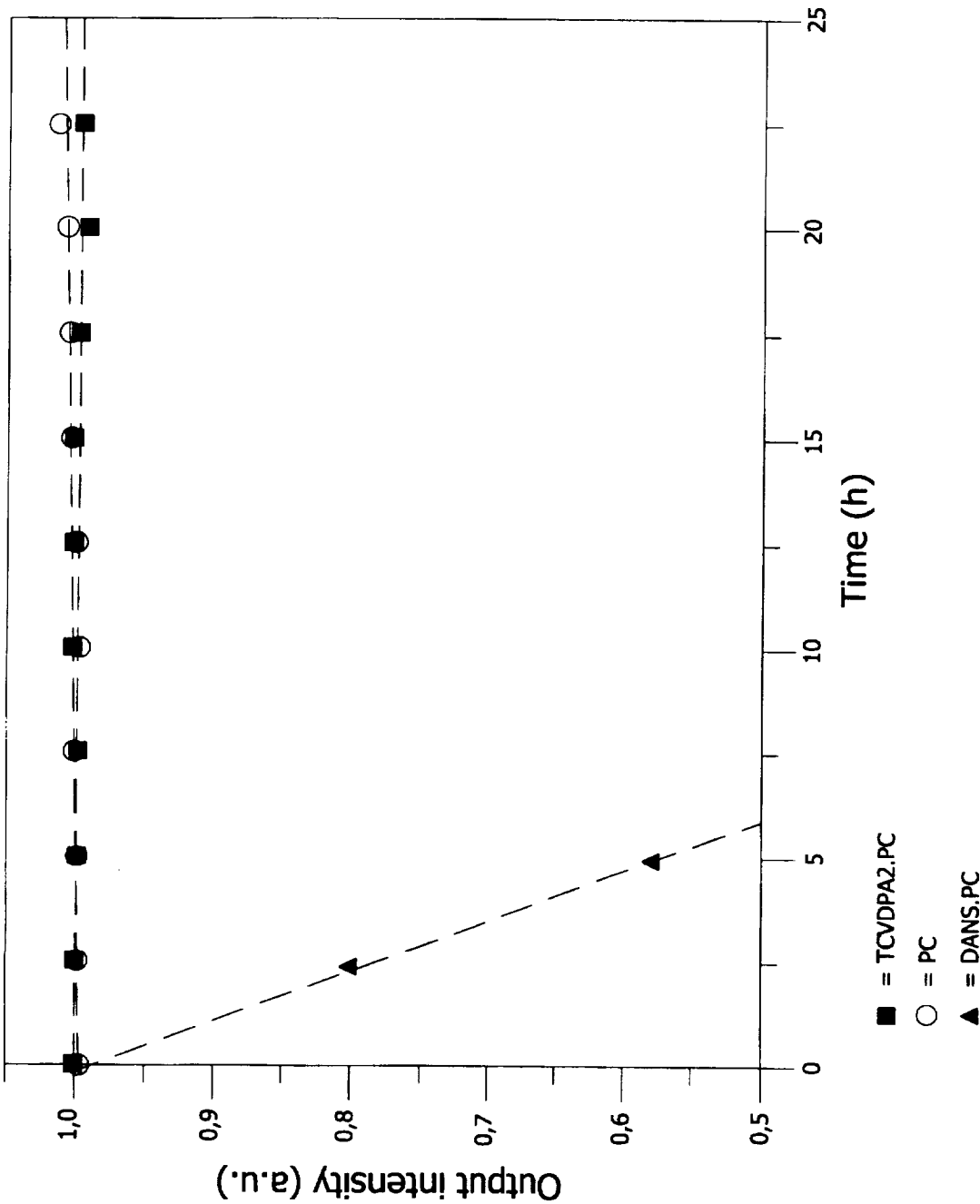
FIG. 4: Measured output intensity of an optical beam (λ=1319 nm) for three different polycarbonate polymer systems containing DANS, the TCVDPA-2, and no chromophores.
Figure 5:
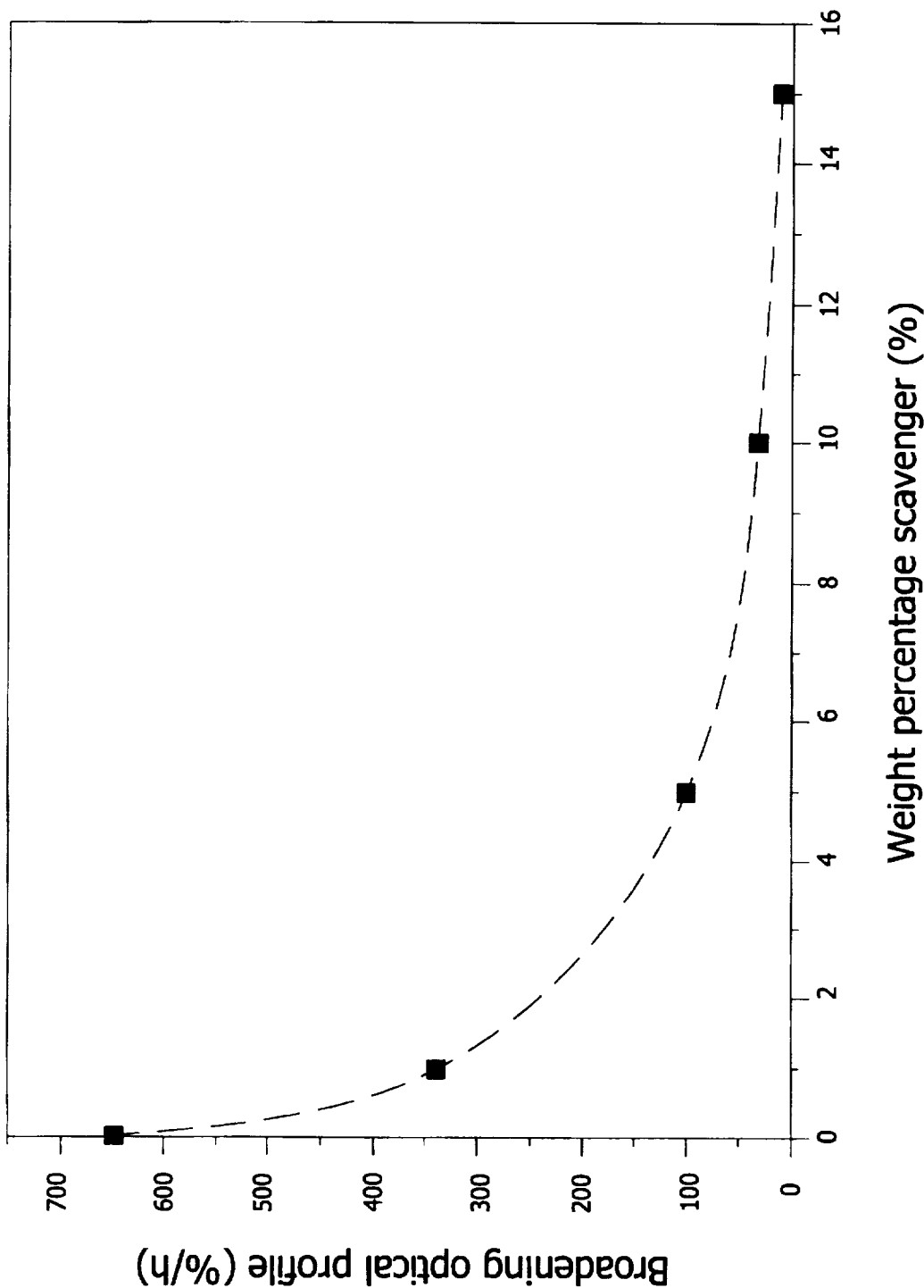
FIG. 5: Broadening of the optical profile of an optical beam (λ=1319 nm, 50 mW out of the film) coupled out of a slab waveguide for DANS polycarbonate polymer waveguides containing different percentages of Perkacit NDBC $^1O_2$ scavenger.
Figure 6A:
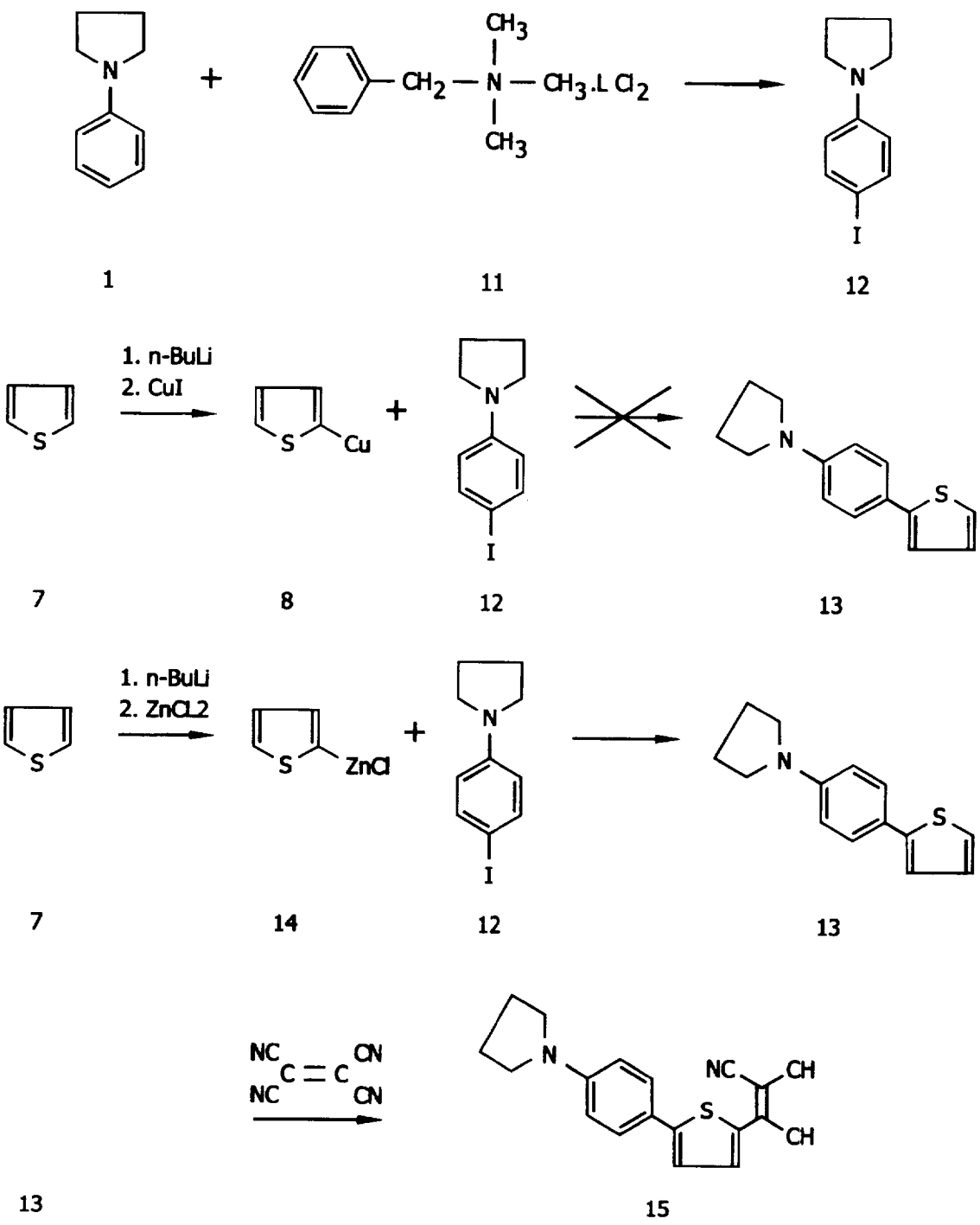
FIG. 6a,b,c: Formulae of the compounds and reaction mechanisms of the examples.
Figure 6B:
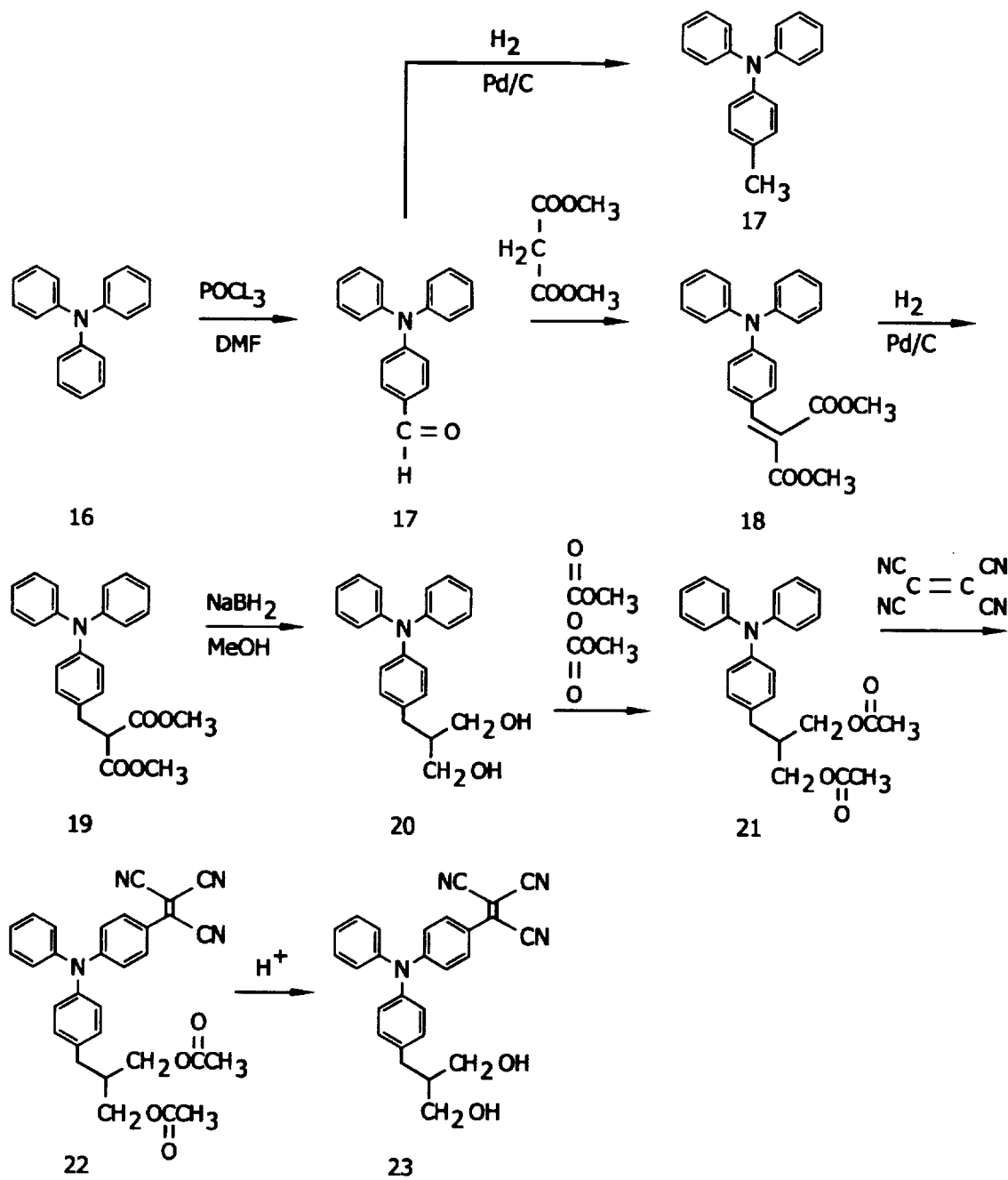
Figure 6C:
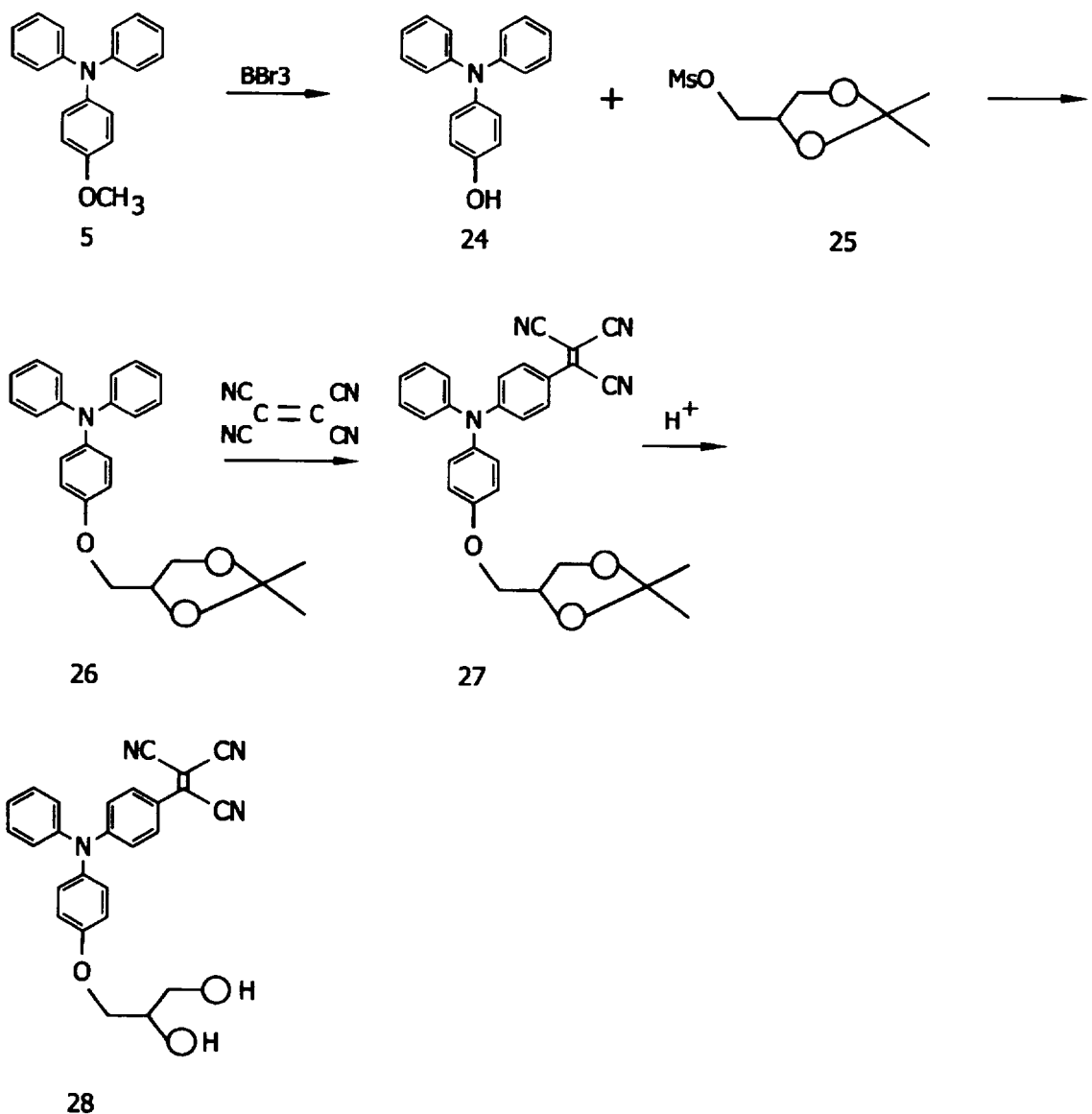

We claim:

1. An electro-optical device comprising two cladding layers and an active layer sandwiched between these cladding layers wherein the active layer comprises a non-linear optically active side chain polymer with NLO chromophores having an N-donor-delocated π system-acceptor structure, the N-donor is selected from being bonded directly to one aromatic group and one hydrogen atom, being bonded directly to two aromatic groups, and being present as one of the following moieties and being bonded to the delocated-π-system:

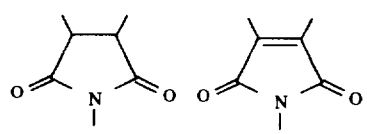

15
-continued

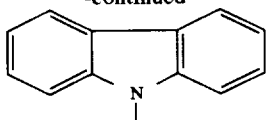

wherein the delocated π system has one of the following structures:

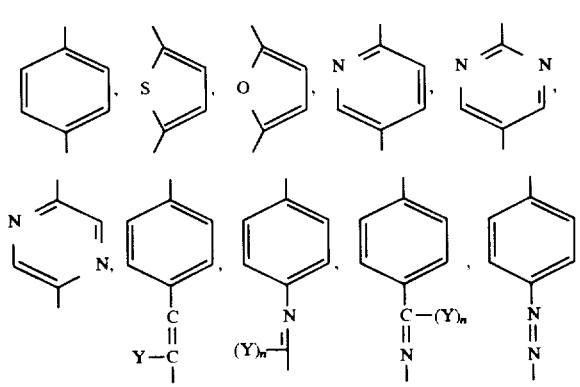

wherein n is 0 or 1 and Y represents —CN or halogen.

2. An electro-optical device comprising two cladding layers and an active layer sandwiched between these cladding layers wherein the active layer comprises a non-linear optically active side chain polymer with NLO chromophores having an N-donor-delocated π system-acceptor structure, the N-donor is selected from being bonded directly to one aromatic group and one hydrogen atom, being bonded directly to two aromatic groups, and being present as one of the following moieties and being bonded to the delocated-π-system:

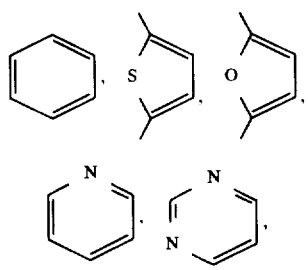

wherein the aromatic groups are independently selected from:

16
-continued and wherein the delocated π system has one of the following structures:

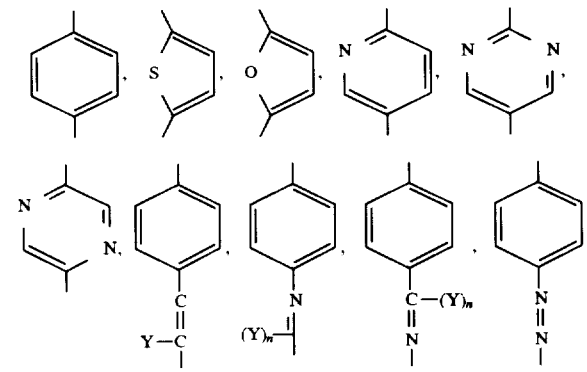

wherein n is 0 or 1 and Y represents —CN or halogen.

3. The electro-optical device of claim 1 wherein the acceptor is selected from —CN, tricyanovinylidene, —CF$_3$, SO$_2$R (R being an alkyl having 1–4 carbon atoms), dicyanovinylidene, a barbiturate group, a thiobarbiturate group, and a group according to the formula:

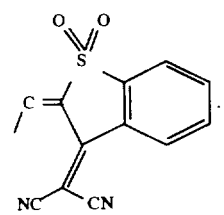

4. The electro-optical device of claim 2 wherein the acceptor is selected from —CN, tricyanovinylidene, —CF$_3$, SO$_2$R (R being an alkyl having 1–4 carbon atoms), dicyanovinylidene, a barbiturate group, a thiobarbiturate group, and a group according to the formula:

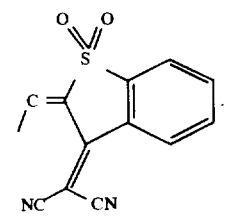

5. A method for the preparation of the electro-optical device of claim 1 comprising the steps of:
  applying a cladding layer onto a substrate;
  applying an active layer onto the cladding layer;
  defining a channel pattern in the active layer;
  poling the NLO-polymer of the active layer;
  applying a cladding layer onto the active layer; and
  applying pads and electrodes onto the cladding layer.

6. A method for the preparation of the electro-optical device of claim 2 comprising the steps of:

applying a cladding layer onto a substrate;
applying an active layer onto the cladding layer;
defining a channel pattern in the active layer;
poling the NLO-polymer of the active layer;
applying a cladding layer onto the active layer; and
applying pads and electrodes onto the cladding layer.

7. A method for the preparation of the electro-optical device of claim 3 comprising the steps of:

applying a cladding layer onto a substrate;
applying an active layer onto the cladding layer;
defining a channel pattern in the active layer;
poling the NLO-polymer of the active layer;
applying a cladding layer onto the active layer; and
applying pads and electrodes onto the cladding layer.

8. A method for the preparation of the electro-optical device of claim 4 comprising the steps of:

applying a cladding layer onto a substrate;
applying an active layer onto the cladding layer;
defining a channel pattern in the active layer;
poling the NLO-polymer of the active layer;
applying a cladding layer onto the active layer; and
applying pads and electrodes onto the cladding layer.

* * * * *